United States Patent
Datz et al.

(10) Patent No.: US 11,326,756 B1
(45) Date of Patent: May 10, 2022

(54) VEHICLE LED LAMP

(71) Applicant: STAR HEADLIGHT & LANTERN CO., INC., Avon, NY (US)

(72) Inventors: R. Michael Datz, Greece, NY (US); James J. Cronmiller, West Henrietta, NY (US)

(73) Assignee: Star Headlight & Lantern Co., Inc., Avon, NY (US)

( * ) Notice: Subject to any disclaimer, the term of this patent is extended or adjusted under 35 U.S.C. 154(b) by 0 days.

(21) Appl. No.: 17/190,063

(22) Filed: Mar. 2, 2021

Related U.S. Application Data

(60) Provisional application No. 62/984,254, filed on Mar. 2, 2020.

(51) Int. Cl.
| | |
|---|---|
| *F21S 41/265* | (2018.01) |
| *F21S 41/143* | (2018.01) |
| *F21V 23/00* | (2015.01) |
| *F21S 43/14* | (2018.01) |
| *F21S 43/20* | (2018.01) |
| *F21S 41/663* | (2018.01) |

(Continued)

(52) U.S. Cl.
CPC ........... *F21S 41/265* (2018.01); *F21S 41/143* (2018.01); *F21S 41/663* (2018.01); *F21S 43/14* (2018.01); *F21S 43/20* (2018.01); *F21V 23/003* (2013.01); *F21Y 2113/10* (2016.08); *F21Y 2115/10* (2016.08)

(58) Field of Classification Search
CPC ........ F21S 41/265; F21S 41/663; F21S 43/20; F21S 43/14; F21S 43/143; F21V 23/003
See application file for complete search history.

(56) References Cited

U.S. PATENT DOCUMENTS

| | | | |
|---|---|---|---|
| 5,803,579 A | * | 9/1998 | Turnbull ............... F21S 41/143 362/516 |
| 6,025,775 A | | 2/2000 | Erlandson |
| 6,515,584 B2 | | 2/2003 | Deyoung |

(Continued)

OTHER PUBLICATIONS

Star Headlight & Lantern Co., Inc., Star Warning Systems® Catalog, p. 28, http://catalogs.star1889.com/star-warning-systems-catalog/files/assets/basic-html/index.html#28, printed Feb. 25, 2020.

(Continued)

*Primary Examiner* — Bryon T Gyllstrom
(74) *Attorney, Agent, or Firm* — Kenneth J. LuKacher; Kenneth J. LuKacher Law Group

(57) ABSTRACT

A vehicle LED lamp having a housing with a front lens of lens elements, a circuit board with LEDs, each providing light of one of three different colors, in which each LED is positioned with respect to a different one of the lens elements. A controller for operating the LEDs of a first color to indicate one or more of brake application (stop), activation of headlights, or turn signal, a second color to indicate reverse vehicle motion, and a third color to provide visual warning signals of one of solid on or flashing patterns. The LEDs of each of the different colors are positioned along the circuit board to substantially enable an entirety of the front lens to provide illumination from the lamp in each of the first, second, and third colors by the controller actuating those ones of the LEDs of the first, second, and third colors, respectively.

30 Claims, 15 Drawing Sheets

(51) Int. Cl.
*F21Y 115/10* (2016.01)
*F21Y 113/10* (2016.01)

(56) References Cited

U.S. PATENT DOCUMENTS

| | | | |
|---|---|---|---|
| 6,520,669 B1 | 2/2003 | Chen et al. | |
| 6,714,128 B2 | 3/2004 | Abbe et al. | |
| 6,789,930 B2 | 9/2004 | Pederson | |
| 7,316,494 B2 | 1/2008 | Eichhorn et al. | |
| 7,683,772 B2 | 3/2010 | Smith | |
| D632,421 S | 2/2011 | Vukosic et al. | |
| D633,648 S | 3/2011 | Datz | |
| 8,009,364 B2 | 8/2011 | Sassoon | |
| 8,052,313 B2 | 11/2011 | Sassoon | |
| 8,564,205 B2 * | 10/2013 | Roberts | B60Q 1/2603 |
| | | | 315/82 |
| D693,035 S | 11/2013 | Datz et al. | |
| 8,714,794 B2 | 5/2014 | Yamazaki et al. | |
| 8,717,679 B2 | 5/2014 | Sassoon | |
| D712,086 S | 8/2014 | Barbato et al. | |
| 9,010,975 B2 * | 4/2015 | Norris | B60Q 1/34 |
| | | | 362/545 |
| 9,103,520 B1 | 8/2015 | Tessnow et al. | |
| D774,686 S | 12/2016 | Neufeglise et al. | |
| D775,407 S | 12/2016 | Datz et al. | |
| 9,616,810 B1 | 4/2017 | Tucker et al. | |
| 9,637,191 B2 | 5/2017 | Lee | |
| 9,676,323 B2 | 6/2017 | Datz et al. | |
| 9,889,795 B1 | 2/2018 | Cronmiller et al. | |
| 10,197,224 B1 * | 2/2019 | Macias | F21V 7/005 |
| 10,371,324 B2 | 8/2019 | Giametta | |
| 10,551,024 B2 | 2/2020 | Chen et al. | |
| 2002/0024822 A1 * | 2/2002 | Pond | B60Q 1/2696 |
| | | | 362/555 |
| 2002/0057061 A1 | 5/2002 | Mueller et al. | |
| 2005/0157205 A1 | 7/2005 | Voss et al. | |
| 2005/0254240 A1 | 11/2005 | Lawrence et al. | |
| 2006/0267752 A1 * | 11/2006 | Crunk | B60Q 1/2696 |
| | | | 340/479 |
| 2013/0093362 A1 * | 4/2013 | Edwards | F21K 9/232 |
| | | | 315/313 |
| 2014/0016340 A1 * | 1/2014 | Cho | F21S 43/19 |
| | | | 362/516 |
| 2015/0211708 A1 * | 7/2015 | Stavely | F21V 14/06 |
| | | | 348/164 |
| 2015/0362147 A1 * | 12/2015 | Schouboe | F21V 7/0083 |
| | | | 362/237 |
| 2017/0130909 A1 * | 5/2017 | Yeon | H01L 33/50 |

OTHER PUBLICATIONS

Star Headlight & Lantern Co., Inc., Star Warning Systems® Catalog, p. 29, http://catalogs.star1889.com/star-warning-systems-catalog/files/assets/basic-html/index.html#29, printed Feb. 25, 2020.
Grote Industries, Inc., Grote® Vehicle Lighting Systems Reference Guide, pp. 74-109, 2019.
Grote Industries, Inc., 4" Round LED S/T/T with Integrated Back-up Lamp Data Sheet, 2017.
Buyers Products Company, 4 Inch Round Combination Stop/Turn/Tail and Backup Light, https://www.buyersproducts.com/product/4-inch-round-combination-stop-turn-tail-and-backup-light-7052, printed Feb. 11, 2020.
Buyers Products Company, Installation Instructions 32 LED Stop/Turn/Tail/Backup/Strobe Lights, at least as early as Feb. 11, 2020.
Maxxima—A Division of Panor Corporation, Stop Tail Turn Lights, Ultra Thin Hybrids Round Red STT / Back-up, https://www.maxxima.com/products/product_detail/830/Ultra-Thin-HybridS-Round-Red-STT-Back-Up.html, printed Feb. 12, 2020.
Star Headlight & Lantern Co., Inc., Star Constellation, May 26, 2015.
Grote Industries, Inc., 6" Oval LED S/T/T with Integrated Back-up Lamp and 6" Oval LED S/T/T Data Sheet, 2015.
Buyers Products Company, 6 Inch Oval LED Combination Stop/Turn/Tail and Backup Light, https://www.buyersproducts.com/product/6-inch-oval-combination-stop-turn-tail-and-backup-light-7053, printed Feb. 11, 2020.
Maxxima—A Division of Panor Corporation, Stop Tail Turn Lights, Hybrid Series LED Oval Stop/Tail/Rear Turn and Backup Light, https://www.maxxima.com/products/product_detail/451/Hybrid-Series-LED-Oval-StopTailRear-Turn-and-Backup-Light.html, printed Feb. 12, 2020.
Maxxima—A Division of Panor Corporation, Stop Tail Turn Lights, Hybrid Lightnings Oval Red Stop/Tail/Turn/Back up, https://www.maxxima.com/products/product_detail/716/Hybrid-LightningS-Oval-Red-StopTailTurnBack-Up.html, printed Feb. 12, 2020.

* cited by examiner

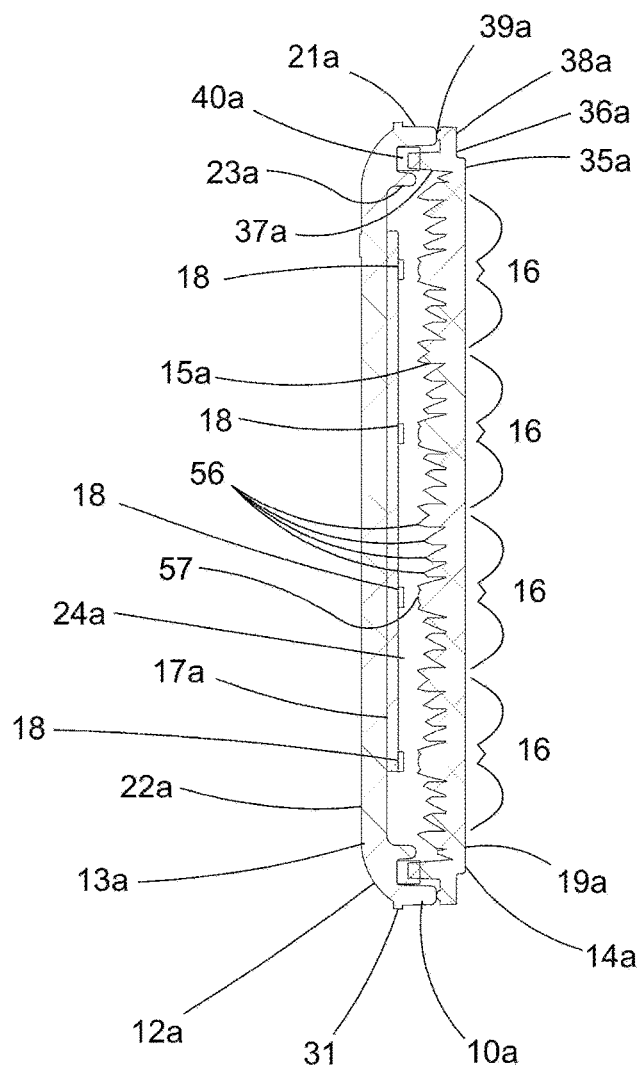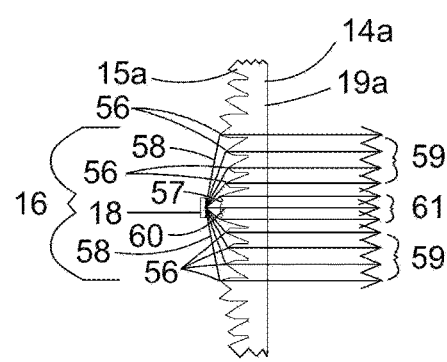
FIG.6A
FIG.5A

VEHICLE LED LAMP

This application claims priority to U.S. Provisional Patent Application No. 62/984,254, filed Mar. 2, 2020, which is incorporated herein by reference.

FIELD OF THE INVENTION

The present invention relates to a vehicle LED lamp, and more particularly to, a vehicle LED lamp with different colored LEDs enabling multifunction operation by combining in a single housing the functionality of three separate lamps providing red illumination for stop, turn, tail signals, white illumination for back-up signals, and amber illumination for warning signals, which are operable by a vehicle driver separate from such vehicle event signals (stop, turn, tail, backup) as utilized by construction, emergency service, roadway maintenance, and garbage pick-up vehicles, and the like. This vehicle LED lamp is advantageous in that it avoids the need for separate lamps along the right and left lower rear of a vehicle for vehicle event signals, and either avoids the need for additional warning lamps along the right and left rear of a vehicle, or enables additional warning signals along the rear of a vehicle that would otherwise not be provided.

BACKGROUND OF THE INVENTION

Multiple lamps are often used to provide signaling along the rear of a vehicle for signaling vehicle events of stop, turn, tail, and backup. These include stop, turn, and tail lamps which light up red when the driver brakes (stops), signals to turn, or turns on the headlights (tail), and also back-up lamps, which light up white when the driver engages the vehicle to move in reverse. Often vehicles have at least one stop, turn, and tail lamp on either side of the rear of the vehicle, and one or more back-up lamps disposed more centrally along the lower rear of the vehicle. While dual color, red and white, LED combination lamps have been designed to combine stop, turn, tail, and backup signal functions, such as described in U.S. Pat. Nos. 8,052,313, 9,010,975 and 10,551,024, each of the colors is outputted from different region along the lamp, such as an outer region and a central region. As a result, the entire front lens of the lamp is not illuminated in each of colors, thereby limiting perception of lamp for each of its different signal function. This is especially a problem when the lamp is viewed at increasing distances.

Typically trucks, in applications for construction, emergency service, roadway maintenance, and garbage pick-up, multiple amber illumination warning devices, such as lamps, beacons and a roof light bar, are mounted to flash visual warning signals that can be seen at different angles about the front, back, and sides of the truck. The rear of large trucks often have round cutouts, typical for Par 36 type lamps, and/or oval cutouts, for mounting of warning and vehicle event signal lamps. However, sometimes this is not the case, and amber illumination warning lamps cannot be easily located along the lower rear of the vehicle due to designed placement of lamps for vehicle event signals.

Buyers Products Company, of Mentor, Ohio, sells vehicle LED lamps under model nos. 5624432 and 5626432 having different designated regions providing red, white, and amber illumination, where the amber illumination is limited to only along a central elongated region of the lamp. As such, this design suffers the same limited perception of different signal functions, as described above, since the entire front lens of the lamp cannot be illuminated in each of the colors. Moreover, these particular Buyers Products Company lamps by limiting amber illumination to a fraction of the lamp's front lens cannot provide the same perception and performance of typical vehicle warning lamps having round or oval profiles where the entirety of the lamp front is utilized, at least substantially, to output warning signals, such as LED warning lamps model nos. DLXTHR (round) and DLXTHU (oval) from Star Headlight and Manufacturing Co. of Avon, N.Y. Further, a warning lamp in which warning signal output is so regionally limited may not provide sufficient illumination in order to meet government regulations for a vehicle mounted warning lights, such as SAE Class 1. Thus, it would be desirable to provide a combination LED lamp for use along the rear of a vehicle providing light of different colors to enable multiple vehicle event signal functions, such stop, turn, tail, and back-up, and further functions to provide visual warning signals, where for each function an entirety of the front lens is at least substantially illuminated in each of the different colors. Such a combination lamp would not only promote awareness of the vehicle's presence on a roadway or construction site to vehicle event signals, but moreover enables the same lamp for vehicle event signals to provide warning signals when needed to supplement other warning lamps which may be present along a vehicle.

SUMMARY OF THE INVENTION

Accordingly, it is an object of the present invention to provide a vehicle LED lamp having different colored LEDs enabling multifunction operation for vehicle event signaling and warning signaling, via a front lens of the housing, where each different colored LEDs when actuated substantially enables an entirety of the front lens to provide illumination from the lamp in each of the different colors.

A further object of the present invention is to provide a vehicle LED lamp having different colored LEDs enabling multifunction operation having a front lens enabling multiple ones of the colored LEDs providing warning signals to be more collimated than illumination from other colored LEDs in order to provide a higher power output of the lamp when illuminating warning signals.

Briefly described, the vehicle LED lamp embodying the present invention has a housing with a front lens having lens elements, and a circuit board with a plurality of LEDs, where each of the LEDs is positioned with respect to a different one of the lens elements. A controller along the circuit board operates the LEDs of at least one of the different colors to provide one or more vehicle event signals from the lamp, and the LEDs of another of the different colors to provide visual warning signals of one of solid on or flashing patterns from the lamp. LEDs of each of the different colors are positioned along the circuit board to substantially enable an entirety of the front lens to provide illumination from the lamp in each of the different colors by the controller actuating those ones of the LEDs of each of the different colors.

The controller operates the LEDs of a first of the different colors (e.g., red) to indicate vehicle event signals of one or more of brake application (stop), activation of headlights (tail), or turn signaling (turn) of a vehicle associated with the lamp, the LEDs of a second of the different colors (e.g., white) to indicate vehicle event signals of backup motion (backup) of the vehicle, and the LEDs of a third of the different colors (e.g., amber) to provide visual warning signals of one of solid on or flashing patterns from the lamp. The controller represents part of electronics with the LEDs mounted upon the circuit board. It receives signals via wires through an opening in a back of the housing, and operate the LEDs, responsive to the signals, in such different colors to indicate vehicle events, and/or visual warning signals of solid on or flashing patterns from the lamp. Additionally, such signals received by the controller may operate LEDs associated with warning signals according to a selected one of a plurality of solid on and different flash patterns.

The LEDs are disposed in an array along the circuit board, where the array extends substantially along an entire length and width of the front lens in order to substantially enable the entirety of the front lens to provide illumination from the lamp in each of the different colors by the controller actuating the LEDs of each of the different colors. Depending on the shape of the housing, which defines the overall shape of the front lens along the top thereof, the array may represent a single two-dimensional array in the case of a round shape housing, or a pair of two-dimensional arrays disposed beside each other in the case of an oval shape housing. The number of LEDs in each row and/or column of the array may be the same or different from each other. In the preferred embodiment, every two adjacent LEDs in a row output light of a different color when actuated such that each successive one of the LEDs in a row is of a different one of the different colors from the next one in the row, and the same color of LEDs are positioned along each column of the array. Other distributions may be used so long as when all LEDs of the same color illuminate an entirety of front lens at least substantially outputs illumination.

Lens elements along the front lens each represent parts of a Fresnel lens having light collimating outer structures that extend continuous with adjacent ones of the lens elements associated with each common row of LEDs along the array, and a central structure that collimates light incident thereto. Lens elements associated with LEDs at the ends of each of the rows provide more collimation than other lens elements. Preferably in distributing LEDs of different colors in the array, different ones of LEDs associated with the color of warning signals are disposed at opposite ends of each row of LEDs so that lens elements associated with these LEDs provide more collimation of warning signals from the lamp. Thus, the lamp achieves a higher power output when illuminating warning signals than for the one or more colors associated with vehicle event signals. While the illumination in each of the colors from the lamp may not be uniformly distributed along its front lens, the output illumination is similar in each of the colors to prior art vehicle LED lamps located along the rear of a vehicle that provide single color illumination one of red for stop, tail, and turn, white for backup, and for prior art single color LED amber warning lamps.

The vehicle may have a plurality of visual warning devices which are mounted along the vehicle along one or more of the front, back, sides, or roof. The LEDs providing visual warning signals in the herein described vehicle LED lamp may be actuated by the controller when one or more of these visual warning devices are actuated. Like these visual warning devices, illumination of warning signals from the vehicle LED lamp of the present invention may be operable by a vehicle driver separate from occurrence of one or more vehicle events (stop, turn, tail, and/or backup) actuating vehicle event signals from the vehicle LED lamp.

The present invention further provides a vehicle LED lamp having a front lens, a plurality of LEDs presented to the front lens each providing light of one of different colors, where the LEDs are disposed in an array extending along two orthogonal dimensions, in which each of the dimensions substantially extends along a different one of a length and entire width of the front lens. A controller operates the LEDs of at least a first of the different colors (e.g., red) to indicate one or more vehicle events, and a second of the different colors (e.g., amber) to provide a selected one of a plurality of different outputs of visual warning signals. The vehicle events may be brake application, activation of headlights, and/or turn signaling of a vehicle associated with the lamp, and the warning signals may be one of solid on or flashing patterns. Preferably, the LEDs of a third of the different colors (e.g., white) are provided to indicate the vehicle event of backup motion of the vehicle, such as beneficial when the vehicle LED lamp is disposed along the rear of the vehicle.

The invention further embodies a method for providing visual warning signals from a vehicle LED lamp having the steps of: disposing a circuit board in a housing facing a front lens having lens elements; providing along the circuit board a plurality of LEDs each providing light of one of different colors, in which each of the LEDs is positioned with respect to a different one of the lens elements; controlling the LEDs of at least one of the different colors to provide one or more vehicle event signals, and the LEDs of another of the different colors to provide warning signals of one of solid on or flashing patterns; and positioning the LEDs of each of the different colors along the circuit board to substantially enable an entirety of the front lens to provide illumination from the lamp in each of the different colors by those ones of the LEDs of each of the different colors.

While the vehicle LED lamp is described for use along the rear of the vehicle, it may be used along the front of the vehicle, or even in non-automotive vehicles, such as boats or planes, in which different colors of LEDs are utilized as needed in such environments.

BRIEF DESCRIPTION OF THE DRAWINGS

The foregoing and other objects, features, and advantages of the invention will become more apparent from a reading of the following description in connection with the accompanying drawings in which:

FIG. 5A is a cross-sectional view along line 5A-5A of FIG. 3 in the direction of arrows as the end of such section lines;

FIG. 6A is a broken cross-section view of FIG. 5A having an optical diagram showing light ray arrows through structures from an LED for one of the lens elements along section line 5A-5A;

DETAILED DESCRIPTION OF THE INVENTION

Figure 3:
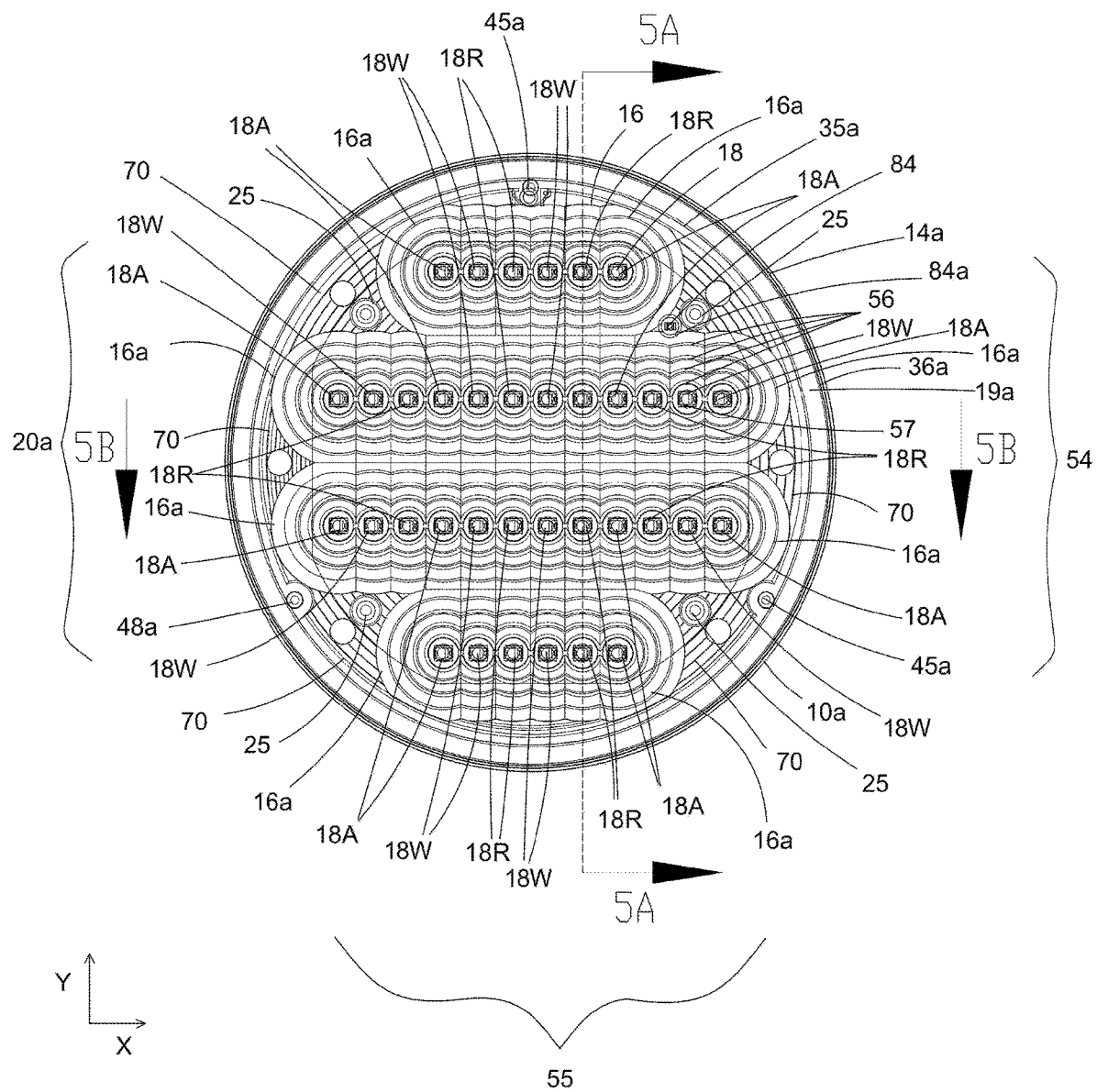
Figure 4:
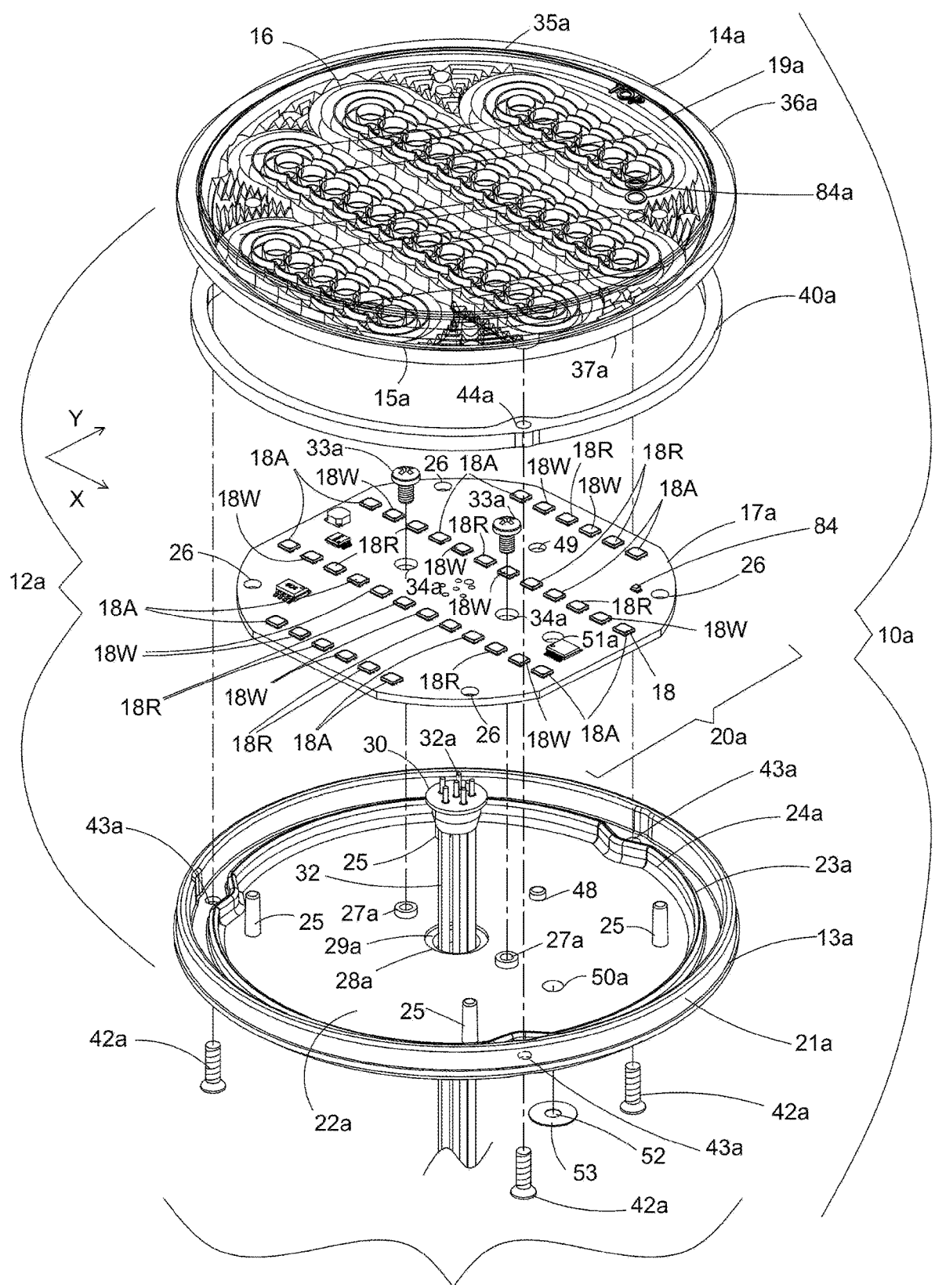
FIG. 4 is an exploded perspective view of the vehicle lamp of FIGS. 1-3.

Referring to FIGS. 1, 2, 3, 4, 5A, and 5B, a vehicle lamp 10a is shown having a housing 12a having a front lens 14a with lens (or optical) elements 16, and light sources provided by LEDs (light emitting diodes) 18 each outputting light of one of three colors, red, white, and amber, which are represented by LEDs 18R, 18W, and 18A, respectively (FIGS. 3 and 4). As best shown in the exploded view of lamp 10a of FIG. 4, LEDs 18 are mounted in an array 20a upon a circuit board 17a facing front lens 14a where each lens elements 16 is disposed to principally receive light from a different one of the LEDs 18. Front lens 14a has a first surface 15a facing circuit board 17a with optical structures provided by lens elements 16 to refract incident illumination, and a flat second surface 19a through which illumination exits front lens 14a and extends outward from lamp 10a. Lens elements 16 having additional refractive power are denoted as lens element 16a and are aligned over different ones of LEDs 18A.

Referring to FIGS. 4, 5A, 5B, and 7, housing 12a has a base 13a shaped to provide a round tray having an outer wall 21a with a lower wall 22a, and an interior wall 23a which is generally circular to define a cavity 24a into which circuit board 17a is seated. Four pegs 25 extend upward from lower wall 22a and pass into holes 26 in circuit board 17a to align the circuit board in housing 12a. A center opening or aperture 28a having a circular recess 29a extends through base 13a and receives a plug 30 having wires 32 molded therein presenting ends 32a of wires 32 for connection to electronics on the circuit board 17a. Plug 30 seals opening 28a by extending partially there through with the plug's outer diameter being tapered for frictional engagement in opening 28a. Plug 30 may be of elastomeric material, such as EPDM rubber, which deforms to assure sealing engagement in opening 28a. Screws 33a extend through holes 34a along circuit board 17a into bossed interior thread holes 27a in lower wall 22a of base 13a and tightened to retain and fix circuit board 17a in base 13a. Wires 32 connect to the underside of circuit board 17a and extend through opening 28a away from housing 12a, and will be described in more detail later in connection with electronics on circuit board 17a for separately actuating LEDs 18R, 18W, 18A to enable different colors of illumination from lamp 10a.

Figure 5B:
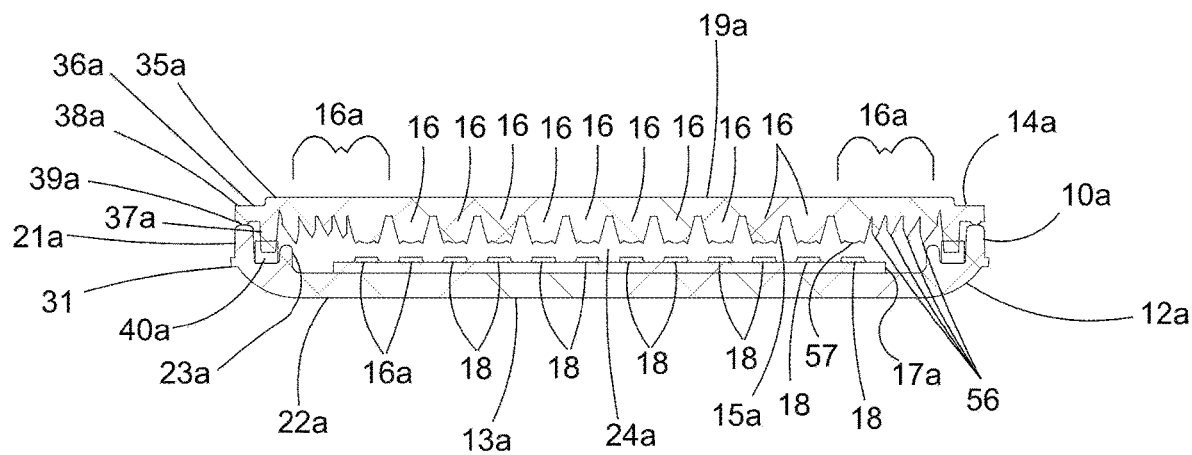
FIG. 5B is a cross-sectional view along line 5B-5B of FIG. 3 in the direction of arrows as the end of such section line.
Figure 7:
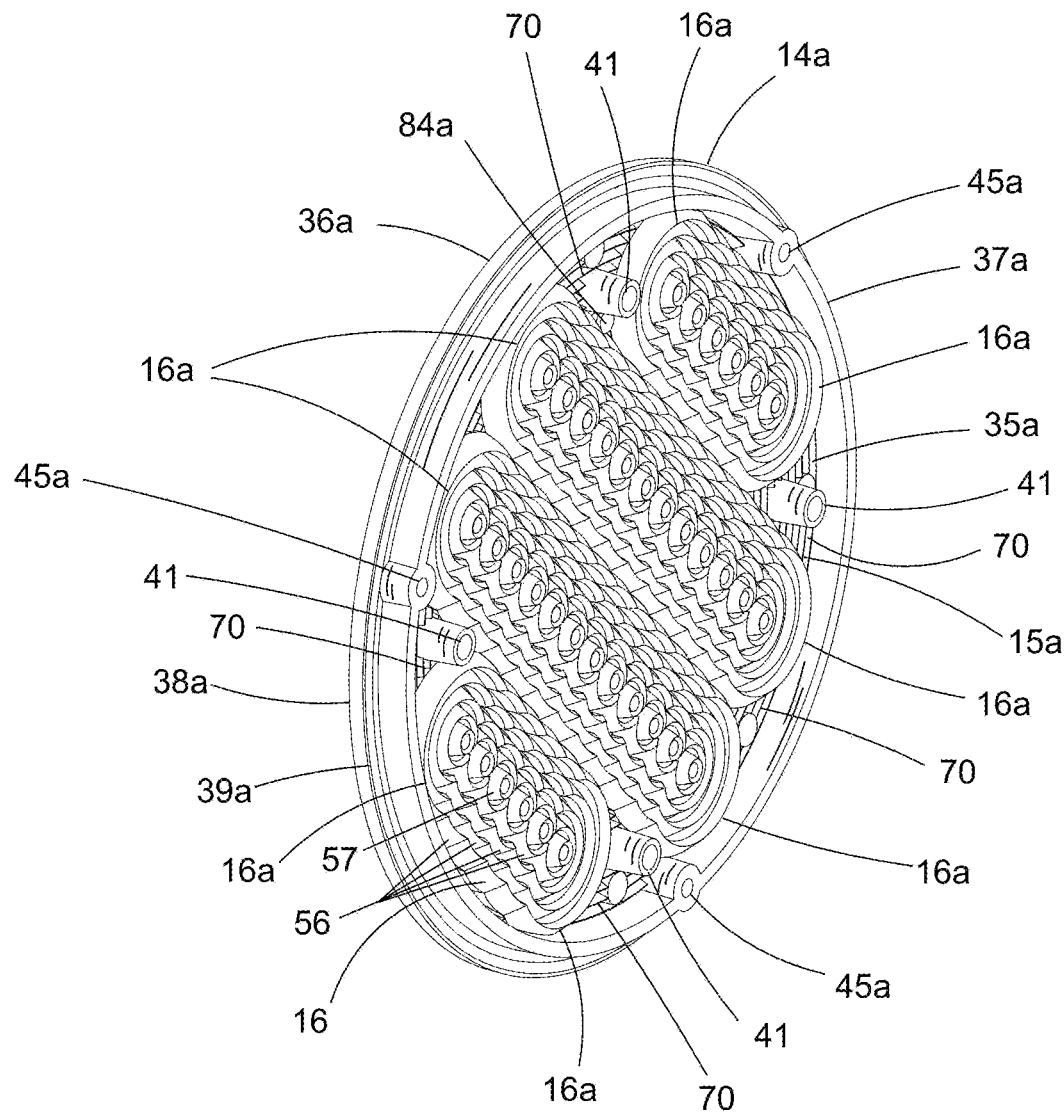
FIG. 7 is a perspective bottom view of the front lens of the lamp removed from the assembly of FIGS. 1-3.

As shown in the cross-sections of FIGS. 5A and 5B, front lens 14a has circular portion 35a, and an outer portion 36a with a downward extending circular wall 37a and an outwardly extending annular lip 38a perpendicular thereto. When assembling front lens 14a onto base 13a, a sealing gasket 40a is first located along lower wall 22a in the gap between outer wall 21a and inner wall 23a of base 13a. Front lens 14 is positioned so that its circular wall 37a downwardly extends to engage gasket 40a and thus partially into the gap between outer wall 21a and inner wall 23a of base 13a, while an annular ridge 39a on the underside of lip 38a abuts the top edge of outer wall 21a of base 13a. Sealing gasket 40a may be of elastomeric material, such as EPDM rubber, which deforms responsive to engagement with circular wall 37a. As front lens 14a is received upon base 13a, the four pegs 25 extend, via holes 26 in circuit board 17, into openings 41 of four downwardly extending cylinders or bosses from surface 15a of front lens 14a, as best shown in FIG. 7.

Once front lens 14a is so placed upon base 13a, three screws 42a each extend through holes 43a in lower wall 22a of base 13a, holes 44a in gasket 40a (where only one hole 44a is shown for purposes of illustration) into threaded openings 45a of front lens 14a and then tightened to retain front lens 14a to base 13a. Each of the three threaded openings 45a extends from a cylinder or boss formed along circular wall 37a (FIG. 7), and as shown in FIG. 4, inner wall 23a of base 13a curves slightly inward to provide space for each such cylinder when wall 37a of front lens 13a is extended into the gap between walls 21a and 23a of base 13a. The front lens 14a provides a top of housing 12a with respect to base 13a, and preferably the word "TOP" is molded into the front lens 14a to assist is manually orienting front lens 14a with respect to base 13a when assembling lamp 10a.

When placement of the circuit board 17a is proper, circuit board 17a lies flush against lower wall 22a along the interior bottom of base 13a, this is assured by a keyed peg 48 extending upwards from lower wall 22a of base 13a into a passageway (or hole) 49 in circuit board 17a. Keyed peg 48 is provided to alert one during manual assembly of housing 12a of improper alignment of circuit board 17a in base 13a that would result in LEDs 18 not properly registering with their associated lens elements 16 of front lens 14a. When circuit board 17a is improperly placed in base 13, keyed peg 48 will abut the underside of the circuit board (instead of passageway 49), which prevents circuit board 17a from lying properly flush along lower wall 22a of base 13a. When such occurs, the circuit board 17a is removed and manually turned so that peg 48 can extend in passageway 49, thereby avoiding risk of circuit board 17a misalignment with the lamp's optical system (i.e., refractive structures 56 and 57 of lens elements 16 and refractive structures 70) of front lens 14a.

Preferably, a hole 50a extends through lower wall 22a of base 13, and another hole 51a extends through circuit board 17a. Holes 50a and 51a align with each other to provide an air vent into cavity 24a that extends between circuit board 17a and the front lens 14a, where an otherwise sealed environment is maintained by gasket 40a and plug 30 to enclose circuit board 17a in housing 12a when assembled. A membrane 52 is attached over hole 50a along the housing 12a exterior by adhesive 53 along media or a flexible substrate that supports membrane 52 as shown in FIG. 4. Air is allowed to pass through membrane 52a into and out of cavity 24a to release air pressure in housing 12a due to temperature variation, such from activation of LEDs, that may over time reduce the integrity of material providing gasket 40a and plug 30. Membrane 52 is of material, such as Gore® material made by W. L. Gore & Associates, Inc. that has a mesh enabling air flow while preventing moisture from entering housing 12a.

Base 13a may be made of injection molded plastic or polycarbonate material, preferably black in color, and has an outer ridge 31a enabling housing 12a to utilize mounting trays, or fixtures and/or brackets mounted in a hole drilled in an external surface of a vehicle's body, as described, for example, in U.S. Pat. No. 9,676,323. Front lens 14 may be made of optically transparent material, such as injection molded optically clear plastic polycarbonate. When assembled, housing 12a is thin, such as for example a height from its base 13a to front surface 19a of 9/16 inches, and may have an outer diameter of 4.4 inches, but other diameters may be used.

LEDs 18 are chip-on-board LEDs mounted to circuit board 17a in a two-dimensional x,y array 20a of rows 54 along the x axis or dimension, and columns 55 along the y axis or dimension, where x and y axes are orthogonal to each other and denoted by x and y arrows in FIGS. 3 and 4. The number of LEDs 18 in each row 54 and column 55 are in accordance with the length and width of front lens 14a in housing 12a along its entire circular portion 35a and desired spacing between adjacently mounted different colored LEDs 18R, 18W, and 18A. In the preferred embodiment, thirty-six LEDs 18 are mounted in four rows 54 and twelve columns 55, where the four rows provide two middle rows 54 each of twelve LEDs, and upper and lower rows 54 each of six LEDs. Thus, array 20a substantially extends along the entire length and width of the front lens 12a. As shown in FIGS. 3 and 4, along each row 54 of array 20a different ones of LEDs 18R, 18W, and 18A are oriented, where each successive one of the LEDs in a row is of a color different from the next one in the row, and LEDs 18A are disposed at opposite ends of each row 54. Along each column 55 of array 20a, the same one of color LEDs 18R, 18W, or 18A are oriented. In other words, every two adjacent LEDs in a row 54 emit light of a different color when actuated, and LEDs along the same column 55 emit light of the same color when actuated.

Along central portion 35a of front lens 14a, lens elements 16 have structures formed in optical material along surface 15a representing portions of a Fresnel lens having light collimating outer structures 56 that extend continuous with adjacent ones of lens elements 16 associated with a common row 54 of LEDs 18, and a central structure 57 that collimates light incident thereto. See the cross-section of FIG. 5A taken through one of columns 55 of LEDs 18 showing structures 56 and 57 of four lens elements 16; and the cross-section of FIG. 5B taken through one of rows 54 of array 20a.

An optical diagram for one of lens elements 16 of FIG. 5A is shown in FIG. 6A for light of one of LEDs 18, where FIGS. 5A and 6A do not show any lens elements 16a. Structures 56 refract light rays 58 from LED 18 outward as light rays 59 that exit surface 19a substantially collimated mostly along the y axis than the x axis, and a central structure 57 refracts light rays 60 from LED 18 outward as light rays 61 that exit surface 19a substantially collimated along both x and y axes. Due to the integration of structures 56 from adjacent lens elements 16 along the x axis, light from LEDs 18 not associated with lens elements 16a are limited in collimation along the x axis resulting is more collimation along the y axis than the x axis through surface 19a.

Figure 6B:
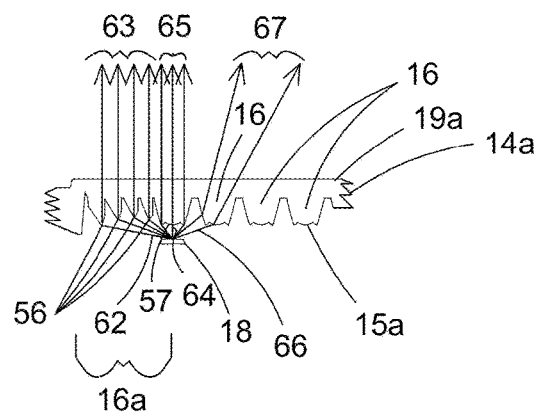
FIG. 6B is a broken cross-section view of FIG. 5B having an optical diagram showing light ray arrows through structures for one of the lens elements at the end of a row of LEDs along section line 5B-5B.

An optical diagram for one of lens elements 16a of FIG. 5B is shown in FIG. 6B for light from of one LED 18 at one end of a row 54. As the curved formations of structures 56 are more prominent for each lens element 16a, they refract more light rays 62 from their associated LED 18 outward as light rays 63 as substantially collimated along both x and y axes outward than by lens element 16 of FIG. 6A. Central structure 57 of each lens element 16a refracts light rays 64 outward as light rays 65 from LED 18 that exit surface 19a substantially collimated along both x and y axes. As the two ends of every row 54 of LEDs 18 are LEDs 18A that emit amber light to their associated lens element 16a, actuation of LEDs 18A associated with visual warning signals are provided with the additional collimation by lens elements 16a enabling a higher power output of the lamp when illuminating warning signals than vehicle event signals associated with LEDs 18R or 18W disposed under other lens elements 16. Twelve LEDs 18R, twelve LEDs 18W, and twelve LED 18A are provided. Eight of the twelve LEDs 18A are at the ends of rows 54 and disposed to principally illuminate different lens elements 16a along front lens 14a, which assures that lamp 10a when actuating LEDs 18A will output warning signals having power of amber illumination that meets or exceeds government requirements, such as SAE Class I.

As depicted in FIG. 6B, light rays 66 from the LEDs 18 also extend to surface 15a along other areas of front lens 14a, such as adjacent lens element 16, and are refracted as non-collimated light rays 67, via surface 19a, from lamp 10a. Thus, while actuation of each of LEDs 18R, 18W, and 18A as distributed in array 20a direct their light principally to optical structures 56 and 57 of their associated lens elements 16 to output red, white, and amber illumination, respectively, from lamp 10a, a portion of their light is incident structures of other nearby or adjacent lens elements 16 associated with non-illuminating LEDs, and even to structures of other refracting portion 70 (FIGS. 1 and 3) formed along central portion 35a of front lens 14a. This enables an entirety of the front lens, at least substantially, to provide illumination from the lamp 10a in each of said different colors red, white, and amber.

It is understood that the light from actuated LEDs 18 of each color may not appear as being uniformly distributed along the entire front lens 14a, but the overall illumination from the lamp is comparable to prior art vehicle LED lamps providing single color illumination for vehicle event signals or warning signals. Further, due to resolution of the human eye, such non-uniformity of illumination in each of the colors is less noticeable with increase viewing distance from lamp 10a.

The lamp of the present invention may be shaped different than of a Par 36 type as shown by housing 12a, such as shown in FIGS. 8, 9, 10, 11, 12A, and 12B for a lamp 10b having an oval housing 12b with a front lens 14b with an oval central portion 35b and same lens elements 16 and 16a as front lens 14a. In housing 12b, LEDs 18 are provided on circuit board 17b seated in base 13b. LEDs 18 each output light of one of three colors, red, white, and amber, as shown by LEDs 18R, 18W, and 18A, respectively in FIGS. 10 and 11. Like array 20a, LEDs 18 are mounted in an array 20b upon circuit board 17b facing front lens 14b where each lens elements 16 is disposed to principally receive light from a different one of the LEDs 18 when the lamp 10b is assembled. Front lens 14b has a first surface 15b facing circuit board 17b with optical structures provided by lens elements 16 to refract incident illumination, and a flat second surface 19b through which light extends outward from the lamp. While arrays 20a and 20b have the same number of different colored LEDs 18, the LEDs 18 are distributed differently along array 20b, where array 20b has four rows 54 each of nine LEDs and eighteen columns 55 each of two LEDs, in order that the array 20b extends substantially along entire length and width of oval front lens 14b. Array 20b may be considered as being two arrays 20c disposed side by side on a circuit board 17b. Unlike housing 12a, pegs 25 and 48, holes 26 and 49, and openings 41 are not used for aligning circuit board 17b. Instead, wall 23b has two opposing inward indents 73 of different sizes, and circuit board 17b has two notches 72 sized to be received along indents 73 when circuit board 17b is properly seated along base 13b. To assure front lens 14b aligns with base 13b, a peg 25b is provided that extends upward from wall 23b of base 13b and received in hole 25c along front lens 14b near one end of front lens 14b. As such hole 25c is not provided along the opposite end, peg 25b avoid misalignment of front lens 14b with base 13b.

In FIGS. 8-11, 12A, 12B, and 13, elements 13b, 14b, 15b, 17b, 21b, 22b, 23b, 24b, 27b, 28b, 28b, 29b, 31b, 33b, 34b, 35b, 36b, 37b, 38b, 40b, 42b, 43b, 44b, and 45b are same as described earlier for elements 13a, 14a, 15a, 17a, 21a, 22a, 23a, 24a, 27a, 28a, 28a, 29a, 31a, 33a, 34a, 35a, 36a, 37a, 38a, 40a, 42a, 43a, 44a, and 45a respectively, other than being of a shaped to accommodate oval housing 12b. Thus, a discussion of the assembly of housing 12b is not provided. As the LEDs 18 and lens elements 16 of lamp 10b are the same, the illumination performance of lamp 10b for each of the different colors is the same as lamp 10a. When assembled, housing 12b is thin, such as for example a height from its base 13b to front surface 19b of 9/16 inches, and for example, housing 12b may have a length of 6.5 inches, and a width of 2.25 inches.

Figure 11:
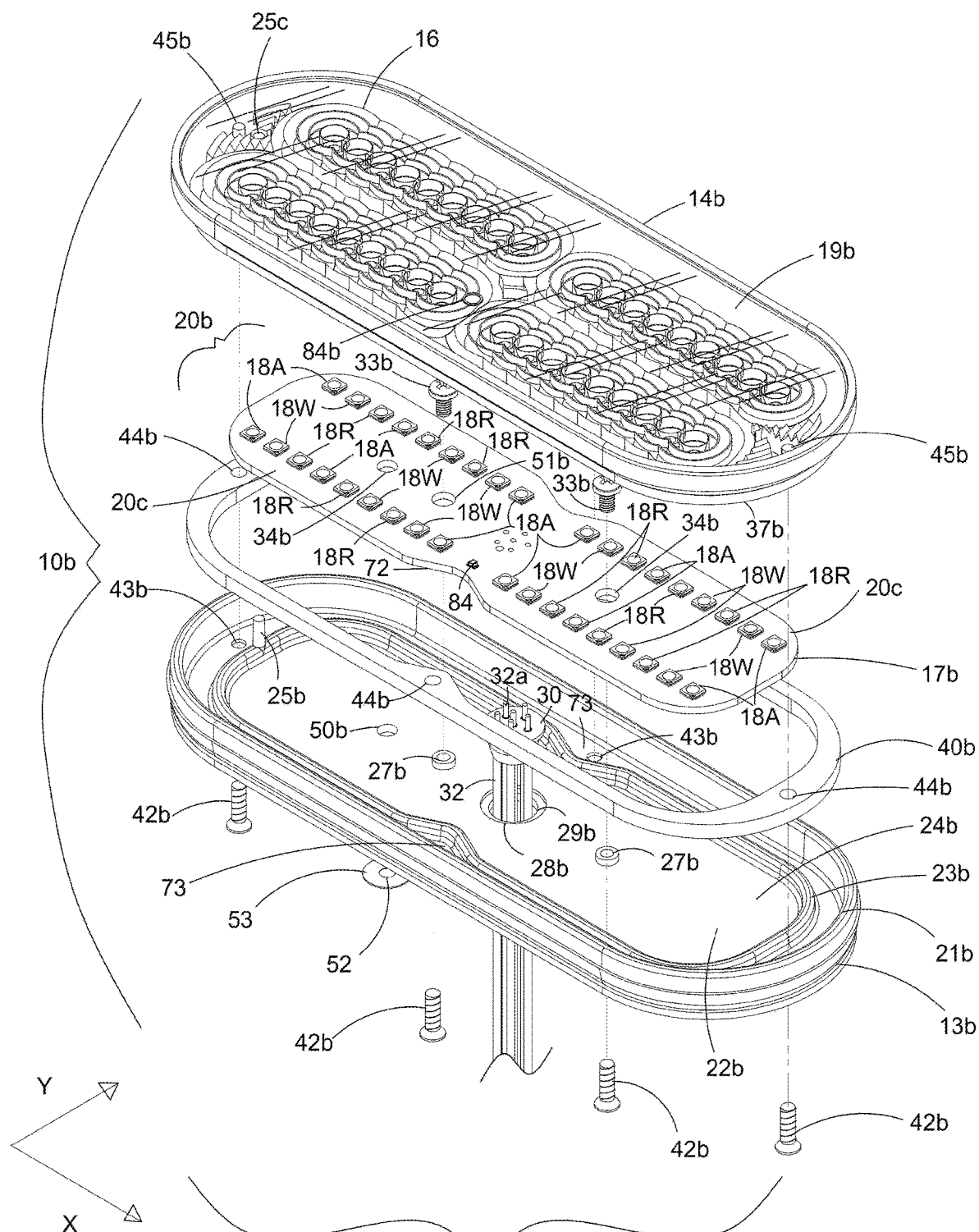
Figure 12A:
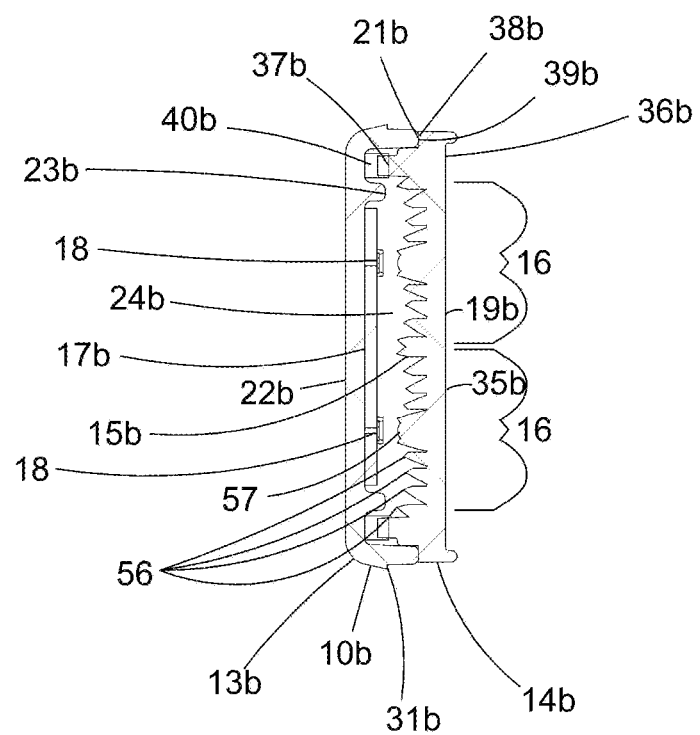
Figure 12B:
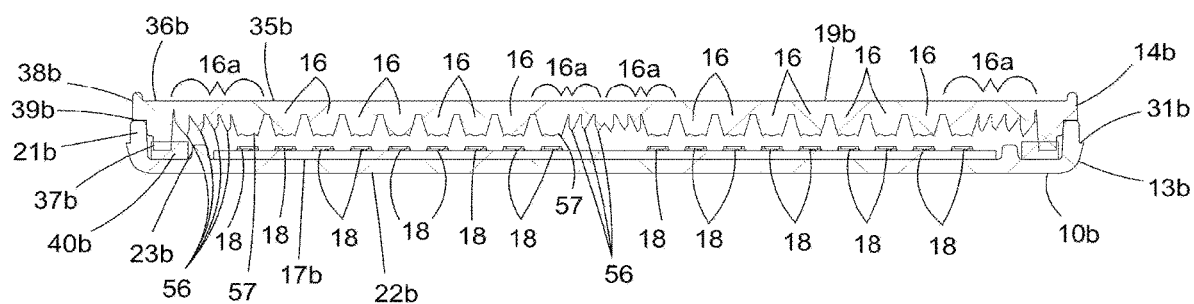
Figure 13:
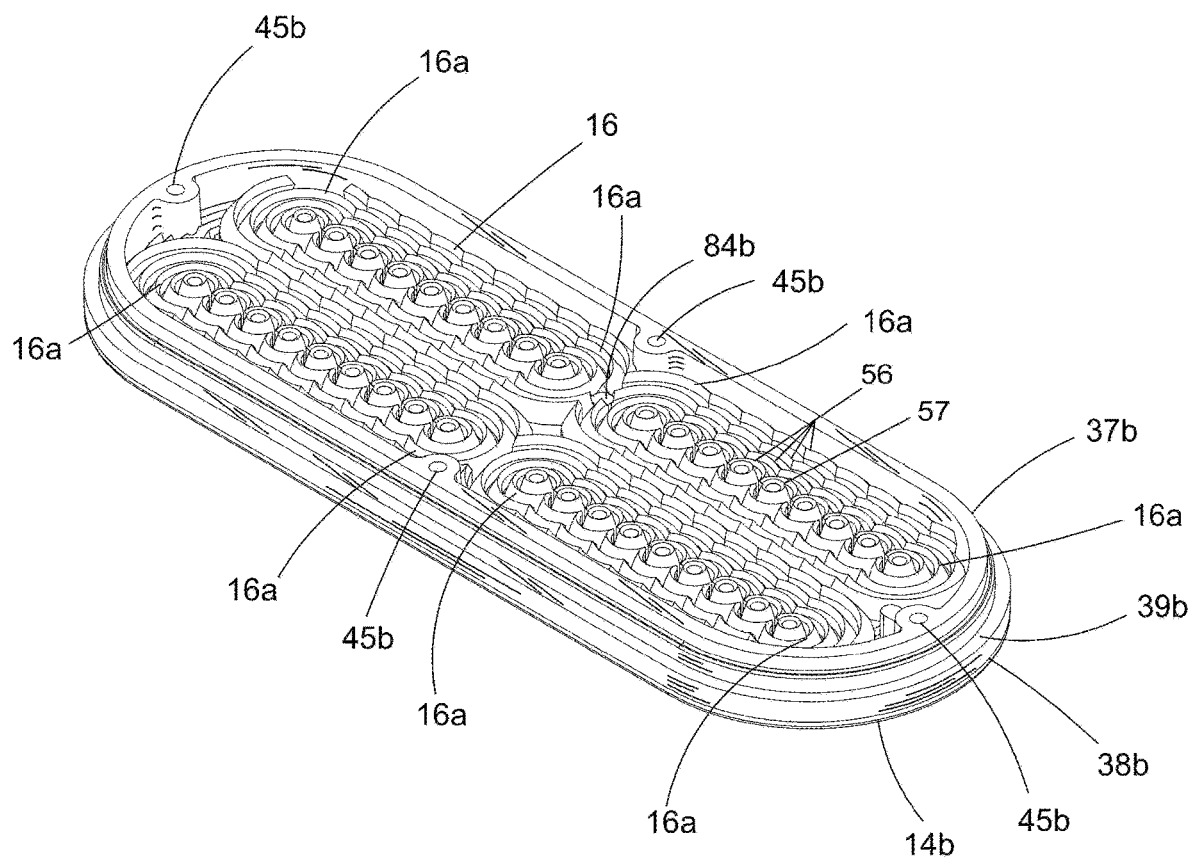
Figure 14:
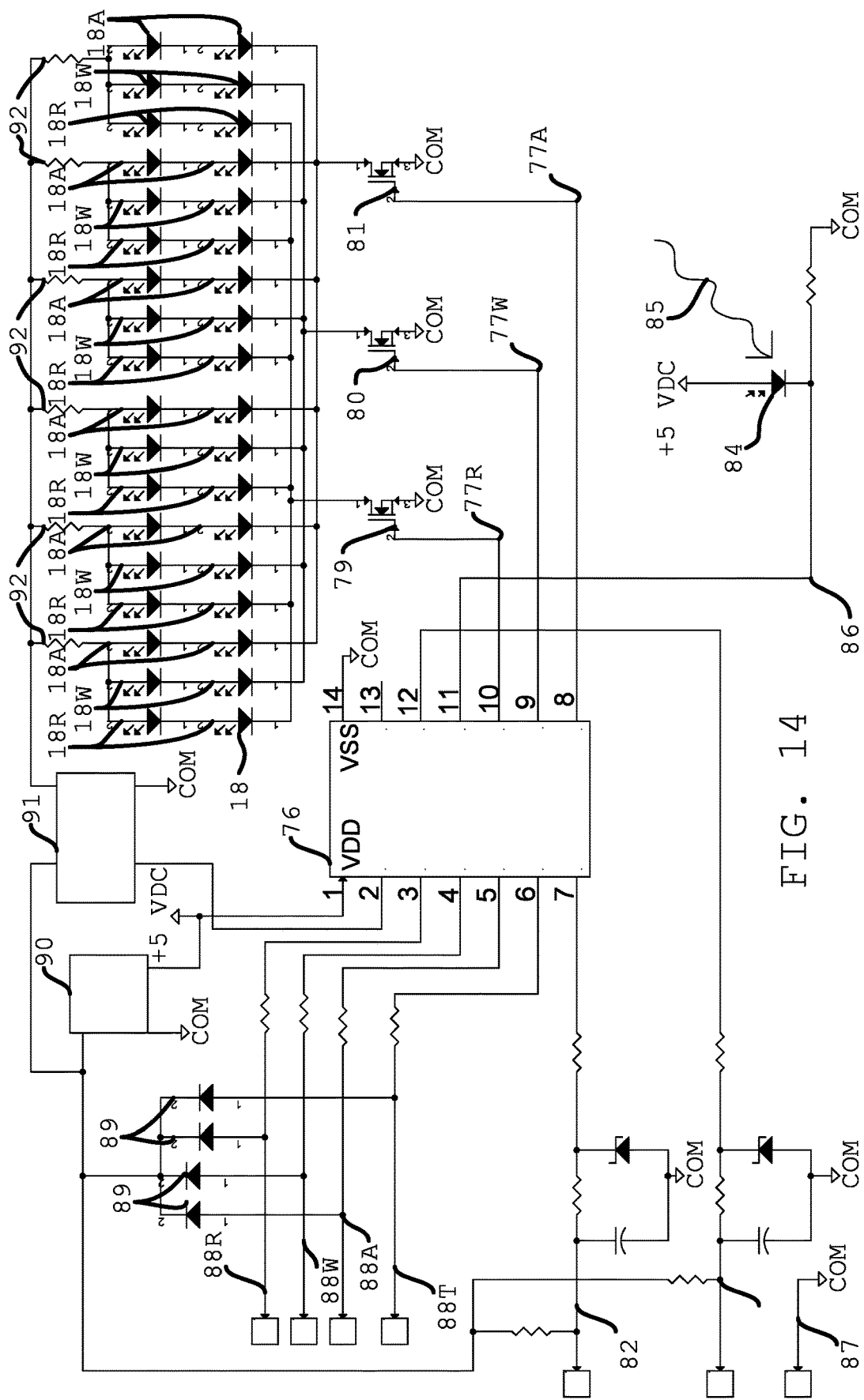
FIG. 14 is a schematic diagram showing the electronics on the circuit board of the lamps shown in FIGS. 1-3 and 8-10.

Referring to FIG. 14, a schematic of the electronics on each circuit board 17a and 17b is shown. Mounted on circuit board 17a and 17b is a controller 76 for lamp 10a and 10b, respectively. Controller 76 outputs signals along an enable line 77R which when high (on) switches, via a MOSFET 79, to drive current to LEDs 18R, and when the enable line 77R is low (off), the MOSFET 79 disables drive current to LEDs 18R. Controller 76 outputs signals along an enable line 77W which when high (on) switches, via a MOSFET 80, to drive current to LEDs 18W, and when the enable line 77W is low (off), the MOSFET 80 disables drive current to LEDs 18W. Controller 76 outputs signals along an enable line 77A which when high (on) switches, via a MOSFET 81, to drive current to LEDs 18A and when the enable line 77A is low (off), the MOSFET 81 disables drive current to LEDs 18A. The controller 76 operates in accordance with a program stored in its memory (ROM or RAM) to enable operation of lamp 10a or 10b. For example, controller 76 may be a PIC microcontroller, but other microcontroller, microprocessor, or programmable logic device may be used for controller 58 which can output enable signals along lines 77R, 77W, and 77A to actuate LEDs 18R, 18W, and 18A, respectively. For purposes of illustration, not all components shown in FIG. 14 are present on circuit boards 17a (FIG. 4) and 17b (FIG. 11).

The pattern of operating each of LEDs 18A by controller 76 can be selected by a pattern select input or line 82. By placing on input 82 signals representative of one of different values, addresses, codes, or instructions, detectable by the controller 76, one of multiple different patterns of illumination by LEDs 18A and hence output light from lamp 10a or 10b may be selected, such as solid on, or flashing at different rates or patterns by controlling enable line 77A. If no signal has been provided along pattern select input 76 to enable selection, than a default pattern is used by controller 76 as set forth in memory of the controller. The flashing rate is in accordance with preset on and off intervals stored in memory of the controller 76, such as every 0.5 seconds. A clock in the controller 76 is used to measure each of the flash intervals.

Figure 1:
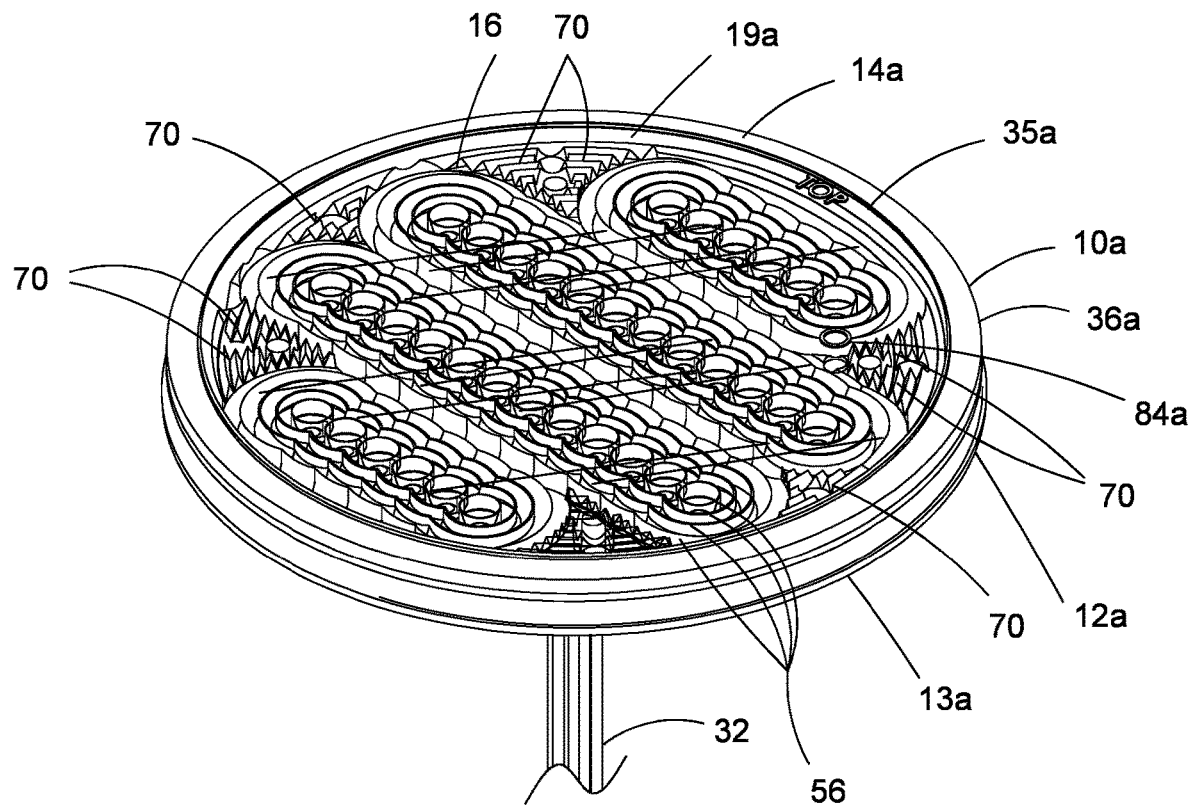
FIGS. 1, 2, and 3 are perspective, side, and front views, respectively, showing the vehicle lamp of the present invention in a circular shaped housing.
Figure 2:
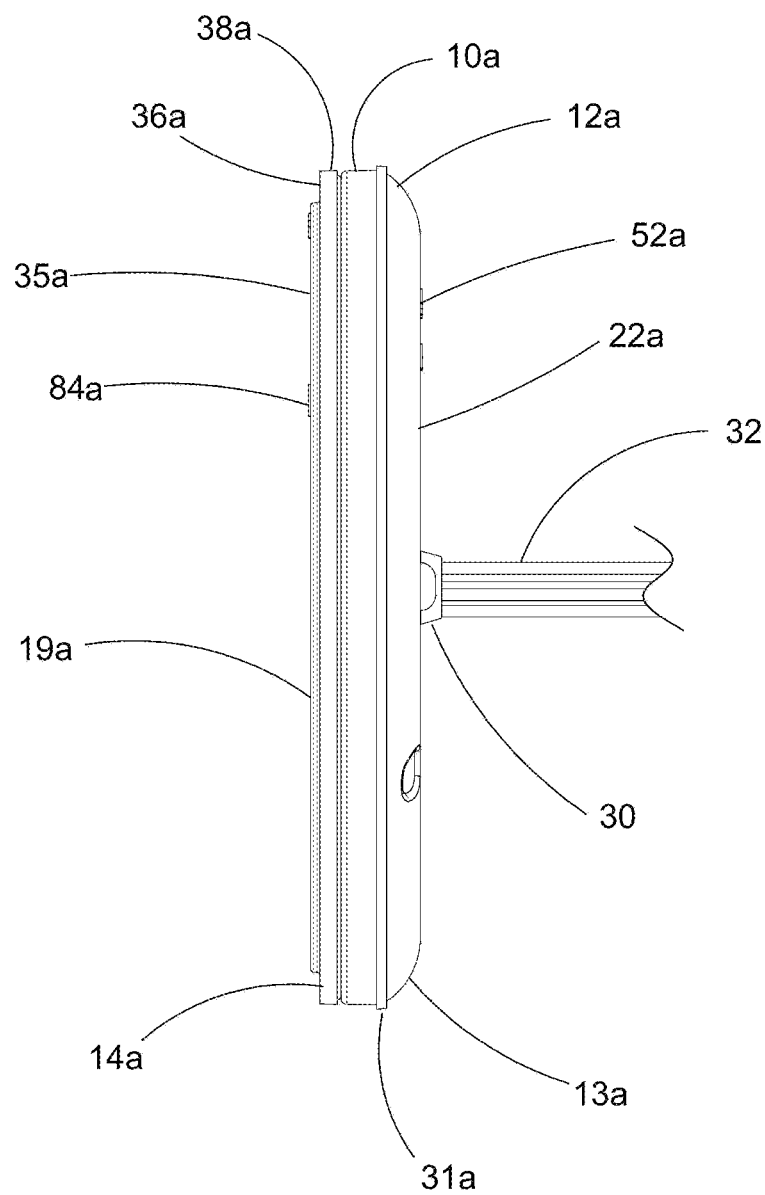
Figure 8:
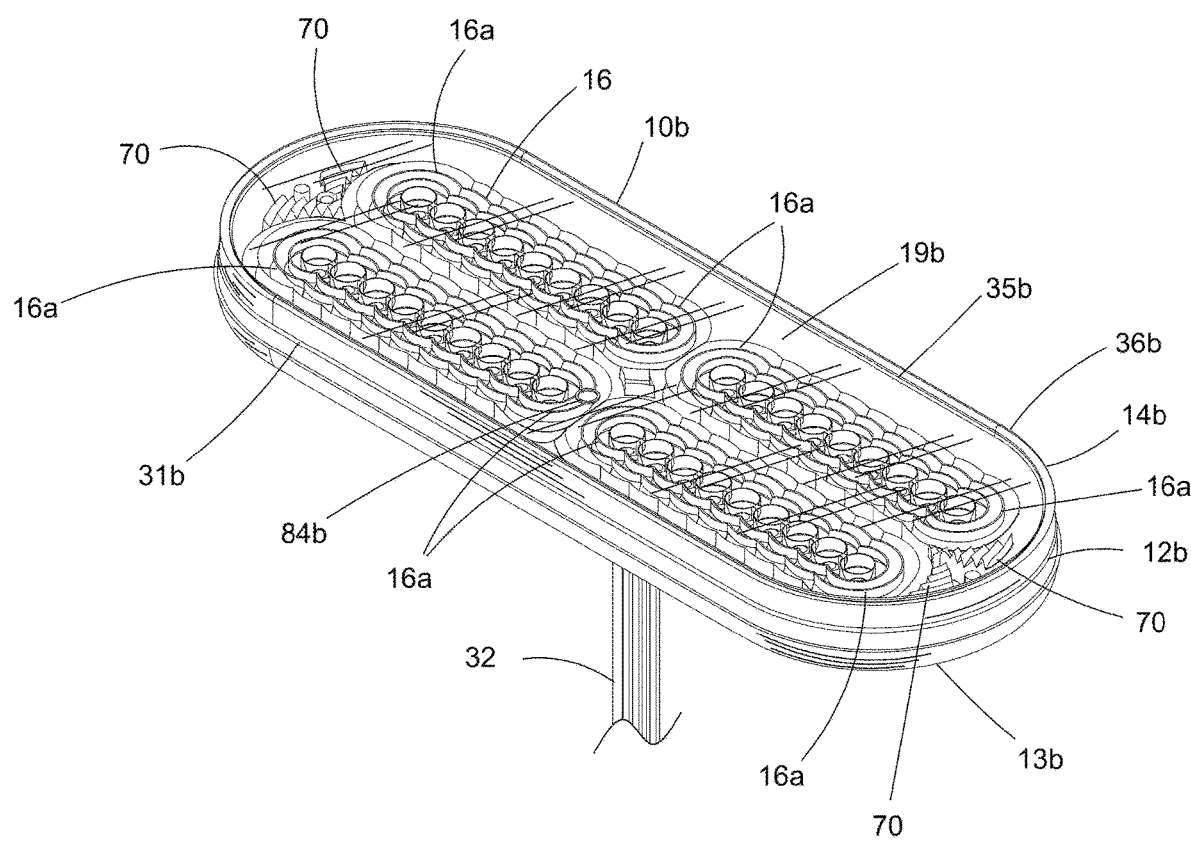
FIGS. 8, 9, 10, 11, 12A, 12B, and 13 are the same views as FIGS. 1, 2, 3, 4, 5A, 5B, and 7, respectively, showing the vehicle lamp of the present invention in the case of an oval shaped housing.
Figure 9:
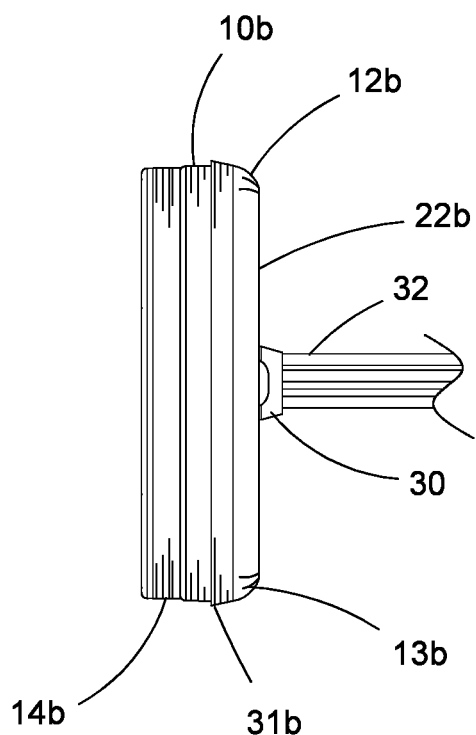
Figure 10:
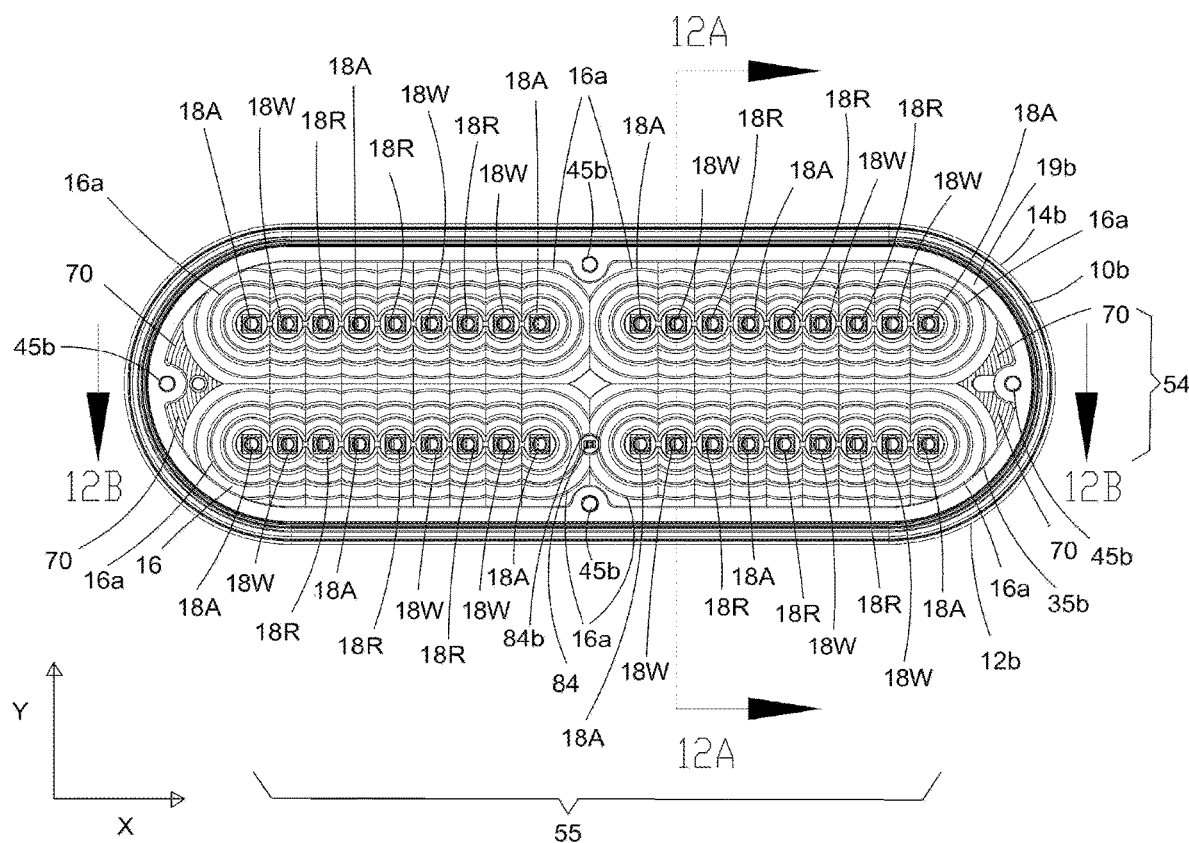

The present invention is not limited to any particular means for pattern input selection to controller 76. For example, an optional photo sensor 84 may be provided on circuit board 17a and 17b to provide signals 86 to controller 76 representative of the amount of external illumination 85 falling on sensor 84. Signals from photo sensor 84 may be used with controller 76 to select pattern of LEDs 18A operation (and ambient illumination), as described in U.S. patent application Ser. No. 16/593,763, filed Oct. 4, 2019, issued as U.S. Pat. No. 11,050,488. Sensor 84 (FIGS. 1 and 3) is mounted on circuit board 17a under an opening 84a in front lens 14a (FIGS. 1, 3, and 4). Sensor 84 (FIGS. 10 and 11) is mounted on circuit board 17b under an opening 84b in front lens 14b (FIGS. 8, 10, and 11). Peg 26b by being received in hole 25c assure that when front lens 14b and base 13b are assembled in housing 12b, sensor 84 is disposed under its opening 84b.

Three color enable or input lines 88R, 88W, and 88A, one for each color red, white, and amber, respectively, and an enable tail 88T, are provided to controller 76. Responsive to controller 76 detecting a high (on) on color enable 88R, 88W, and 88A, controller 76 enables lines 77R, 77W, and 77A, respectively, to actuates LEDs 18R, 18W, and 18A, respectively. Thus, LEDs 18A are actuated in accordance with the pattern stored in memory for visual warning signals, LEDs 18R are actuated by controller 76 to illuminate red visual vehicle event signals for stop (vehicle brake application) and for vehicle turn, and LEDs 18W are actuated to illuminate white visual vehicle event signals for backup (vehicle engaged in reverse). Optionally, pattern for actuation of LEDs 18R and 18W using enable lines 77R and 77W, respectively, may be set in memory of controller 76, such as to enable solid on illumination therefrom.

When any one of enable lines 88R, 88W, or 88A are high (on) such line supplies power (12 VDC or 24 VDC depending on the voltage source externally available) via one of diodes 89 to a voltage regulator 90 and a constant current source 91. Voltage regulator 90 may be a voltage divider that outputs 5 VDC to controller 76 and other components on circuit board 17a and 17b needing 5 VDC for their operation. Constant current source 91 when powered supplies current (e.g., 0.8 A) to those LEDs 18R, 18W, or 18A, via load balancing resisters 92, turned on using MOSFETs 79, 80, or 81 by enable lines 77R, 77W, or 77A, respectively. In the preferred embodiment, six drive circuits are provided each having six LEDs, two of each of the different colors. A ground line 87 is also supplied to the circuit board.

Controller 76 can send signals to constant current source 91 to control its operation. When enable line 88A is high (on) and the stored pattern of warning signals in controller 76 is one of default/selected flash pattern, controller 76, in additional to operating enable line 77A to facilitate the on and off illumination timing cycle or pulse width modulation (pwm) of LEDs 18A to generate such flash pattern from the lamp, may send signal(s) to constant current source 91 during each off illumination part of the cycle or off period of pwm to disable supplying current to all LEDs 18.

Enable tail line 88T is high (on) when vehicle headlights are enabled or when tail lights are otherwise activated by a driver of the vehicle. In response, controller 76 operates the LEDs 18R in a low power mode or state (if brake enable 88A is not high (on) which would otherwise actuate LEDs 18R in a normal power mode as described above). This may be achieved by controller 76 turning enable line 77R high (on) and sending signal(s) to current source 91 to enter a lower power mode which reduces its output current (e.g., 0.4A) to actuate LEDs 18R. Lamp 10a and 10b via circular portion 35a or oval portion 35b of front lens 14a or 14b, respectively, appear to a viewer as a dim red color comparable to a typical vehicle tail light signal. When enable line 88T is low (off), controller 76 signals current source 91 to cease low power mode and turns enable line 77R low (off). Optionally, controller 76 may instead or additionally pulse modulate along enable line 77R, and hence LEDs 18R, periodically turn on and off in accordance with a pattern stored in its memory, so that lamp 10a or 10b appear to a viewer as a dim red color comparable to a typical vehicle tail light signal.

Enable tail line 88T, like when any one of other enable lines 88R, 88W, or 88A are high (on), supplies power (12/24 VDC) via one of diodes 89 to voltage regulator 90 and a constant current source 91. Generally, the absence of power being supplied by any of enable lines 88R, 88W, 88A, or 88T will disable electronics of lamp 10a or 10b, and their LEDs 18, from operation.

In application of lamp 10a or 10b when mounted to a vehicle body, different ones of wires 32 (FIGS. 1, 2, 4, 8, 9, and 11) from housing 12a or 12b extend enable lines into the vehicle. One of wires 32 for enable line 88R is coupled to a brake (stop) wire, and a left or right turn signal wire, which extend within the body of the vehicle as conventionally provided in a vehicle to operate a red rear signaling lamp. One of wires 32 for enable line 88W is coupled to a reverse (backup) wire as conventionally provided in a most vehicles to operate a white rear signal lamp. One of wires 32 for enable line 88T is coupled to a tail wire as conventionally provided in a most vehicles to operate a tail lamp. One of wires 32 for enable line 88A may be coupled to an external controller/system in the vehicle having a switch or button for a driver to activate visual warning devices, including one or more lamps 10a and/or 10b, mounted along the rear of vehicle, such as in the case of a construction, emergency service, roadway maintenance, and garbage pick-up truck.

An optional synchronization line 94 may be provided to controller 76 as an additional one of wires 32. When such synchronization line is switched from high to low, controller 76 resets the cycle of its internal clock. Such is useful when two different ones of LED lamps 10a and 10b, or other visual warning devices, such as beacon(s), light bar, or other types of visual warning lamps, mounted at different locations along the exterior body of the same vehicle as LED lamps 10a and 10b need to be synchronized to each other so that they flash at the same time, or alternate with each other.

Thus, the six wires 32 provided to electronics for circuit board 17a or 17b are: pattern select line 82, ground line 87, color enable lines 88R, 88W, 88A (one for each different color), and tail enable line 88T. Optionally, seven wires 32 and their associated ends 32a in plug 30 may be provided with inclusion of a synchronization line 94 to the electronics of the lamp. When tail low power mode or state for red LEDs 18R is not needed, enable line 88T and its wire 32 need not be provided, and operation of controller 76 for red LEDs 18R in low power state is not used. Also, enable line 88W and its wire 32 need not be provided where lamp 10a or 10b does not need to provide white backup signals.

Other number of LEDs 18 of different colors LEDs 18R, 18W, or 18A than shown may be provided along circuit board 17a or 17b and similarly sequenced along the array 20a or 20b, or LEDs of different colors may be differently sequenced, so long as multiple ones of LEDs 18A are oriented with respect to lens elements 16a. Also, one or all of the different colors of LEDs may be different than red, white, and amber as lamp 10a or 10b may be used in other environments needing a different set of three colors. While distributions of LEDs 18R, 18W, or 18A in array 20a or 20b are preferred, other distributions may be used, so long as LEDs 18A at the end of rows 54 are disposed with respect to lens elements 16a in order to increase output power of amber illumination used as warning signals. Also, other housings of different cross-sectional shape than circular or oval may also be used, so long as the size of the array 20a or 20b, in terms of either number of LEDs 18, and/or spacing there between, along x and y axes are selected in accordance with the shape of the front lens about its outer periphery in the same manner as shown for example for the circular case of lamp 10a and oval case of lamp 10b, and lens elements 16, including those providing lens element 16a, are provided along the front lens with respect to such LEDs as described above.

Less preferably, lamp 10a and 10b may instead provide two different colors LEDs, one of amber LEDs 18A, and another of a different color, such as red or white LEDs, in an array along circuit board 17a and 17b, respectively, in which the number of LEDs of each of such two different colors in each row 54 are such that multiple ones of LEDs 18A reside at the ends of each row align with lens elements 16a.

From the foregoing description it will be apparent that there has been provided a vehicle LED lamp, and method for making same. Variations and modifications herein this described lamp and method will undoubtedly suggest themselves to those skilled in the art. Accordingly, the foregoing description should be taken as illustrative and not in a limiting sense.

The invention claimed is:

1. A vehicle LED lamp comprising:
   a housing with a front lens having lens elements;
   a circuit board in said housing with a plurality of LEDs each providing light of one of different colors, in which each of said LEDs is positioned with respect to a different one of said lens elements; and
   a controller for operating said LEDs of at least one of said different colors to provide one or more vehicle event signals from the lamp, and said LEDs of another of said different colors to provide visual warning signals from the lamp of one of solid on or flashing patterns, wherein said LEDs of each of said different colors are positioned along said circuit board to substantially enable an entirety of said front lens to provide illumination from the lamp in each of said different colors by said controller actuating those ones of said LEDs of said different color.

2. The vehicle LED lamp of claim 1 wherein said at least one of said different colors represents a first of said different colors and a second of said different colors, said controller operates said LEDs of said first of said different colors to indicate one or more of brake application, activation of headlights, or turn signal of a vehicle when associated with the lamp, said LEDs of said second of said different colors to indicate backup motion of the vehicle when associated with the lamp, and said LEDs of said another of said different colors being a third of said different colors to provide said one of solid on or flashing patterns visual warning signals from the lamp.

3. The vehicle LED lamp of claim 2 wherein said first, said second, and said third of said different colors are red, white, and amber, respectively.

4. The vehicle LED lamp of claim 1 wherein multiple ones of said lens elements associated with said LEDs providing said visual warning signals provide a higher power output than other ones of said lens elements associated with said LEDs providing said one or more vehicle event signals.

5. The vehicle LED lamp of claim 1 wherein said controller represents part of electronics with said LEDs mounted upon said circuit board, and said controller receives signals via wires to said housing, and said controller responsive to said received signals operates said LEDs of said at least one of said different colors, or said LEDs of another of said different colors in one of said solid on or flashing patterns.

6. The vehicle LED lamp of claim 1 wherein said controller represents part of electronics with said LEDs mounted upon said circuit board, and said controller receives signals via wires to said housing, and said controller responsive to said received signals operates said LEDs of said at least one of said different colors, or said LEDs of another of said different colors of a selected one of a plurality of said solid on and different flash patterns.

7. The vehicle LED lamp of claim 1 wherein a vehicle associated with the lamp has a plurality of visual warning devices separate from said housing and from association with any of said one or more vehicle event signals, and said LEDs providing said visual warning signals are actuated by said controller when one or more of said plurality of visual warning devices actuate.

8. The vehicle LED lamp of claim 7 wherein at least one of said plurality of visual warning devices is provided by a beacon or light bar mounted to the vehicle.

9. The vehicle LED lamp of claim 1 wherein said LEDs are disposed in an array along said circuit board, said lens elements comprise refractive structures, said array extends substantially along an entire length and width of said front lens, and said LEDs of each of said different colors are distributed in said array to enable with aid of the refractive structures of said lens elements to substantially provide from the entirety of the front lens illumination from the lamp in each of said different colors by said controller actuating those ones of said LEDs of the different color.

10. The vehicle LED lamp of claim 9 wherein said housing is of an oval shape, and said array represents a pair of two-dimensional arrays disposed beside each other along said circuit board.

11. The vehicle LED lamp of claim 1 wherein said LEDs are disposed along said circuit board in a two-dimensional array of rows and columns, wherein in each of said rows every two adjacent ones of said LEDs along the row are of different ones of said different colors, and said LEDs of different ones of said columns are of a same one of said different colors.

12. The vehicle LED lamp of claim 11 wherein for each of said rows of LEDs, each of said lens elements associated with said LEDs in the row represents part of a Fresnel lens having light collimating outer structures that extend continuous with adjacent ones of said lens elements associated with other of said LEDs in the row, and a light collimating central structure, and said lens elements associated with LEDs at opposite ends of the row provide more collimation than other ones of said lens elements associated with said LEDs there between along the row.

13. The vehicle LED lamp of claim 12 wherein said LEDs at said opposite ends of each of said rows are different ones of said LEDs of said another of said different colors providing said visual warning signals.

14. The vehicle LED lamp of claim 1 wherein said housing is of a circular shape, said LEDs are disposed along said circuit board in a two-dimensional array of rows and columns, and said LEDs in at least two different ones of said rows or said columns are different in number in accordance with a diameter of said housing.

15. The vehicle LED lamp of claim 1 wherein said visual warning signals are operable by said controller separate from occurrence of any vehicle event associated with said one or more vehicle event signals.

16. The vehicle LED lamp of claim 1 wherein said housing is mountable along a rear of the vehicle.

17. The vehicle LED lamp of claim 1 wherein each of said LEDs are positioned along said circuit board to direct their light principally to a different one of said lens elements to substantially enable the entirety of the front lens to provide illumination from the lamp in each of said different colors by said controller actuating those ones of said LEDs of the different color and by other ones of said lens elements associated with non-actuating ones of said LEDs receiving a portion of light from nearby said actuating ones of said LEDs.

18. The vehicle LED lamp of claim 17 wherein each of said lens elements comprises refractive structures which substantially collimate light received from a different one of said LEDs outwards from the lamp.

19. A vehicle LED lamp comprising:
a front lens having lens elements;
a plurality of LEDs presented to said front lens each providing light of one of different colors, each of said LEDs being disposed to principally provide light to a different one of said lens elements;
a controller for operating said LEDs of at least a first of said different colors to indicate one or more vehicle events, and said LEDs of a second of said different colors to provide a selected one of a plurality of different outputs of warning signals via said front lens; and
a plurality of different ones of said lens elements disposed to principally receive light from said LEDs of said second of said different colors each have refractive structures that collimate more light from said front lens outward from said lamp than said lens elements having refractive structures disposed to principally receive light from said LEDs of said at least said first of said different colors.

20. The vehicle LED lamp of claim 19 wherein said controller is configured to operate said LEDs of said first of said different colors to indicate said one or more vehicle events associated with brake application, activation of headlights, or turn signal of a vehicle associated with the lamp, and to operate said LEDs of said second of said different colors to provide said selected one of said plurality of different outputs of said warning signals of one of solid on or flashing patterns.

21. The vehicle LED lamp of claim 20 wherein said controller is configured to operate said LEDs of a third of said different colors to indicate backup motion of the vehicle associated with the lamp.

22. The vehicle LED lamp of claim 19 further comprising a housing having said front lens, and a circuit board with said controller along which said LEDs are mounted.

23. The vehicle LED lamp of claim 22 wherein said housing and said front lens are both one of a circular or oval shape.

24. The vehicle LED lamp of claim 19 wherein said LEDs are disposed in an array extending along two orthogonal dimensions, in which each of said two orthogonal dimensions substantially extends along a different one of an entire length and width of said front lens, and said array is sized in each of said dimensions in accordance with a shape of said front lens about an outer periphery thereof.

25. The vehicle LED lamp of claim 19 wherein said LEDs are disposed in an array extending along two orthogonal dimensions of rows and columns, in each of said rows every two adjacent ones of said LEDs along the row are of different ones of said different colors, and said LEDs of different ones of said columns are of a same one of said different colors.

26. The vehicle LED lamp of claim 25 wherein said plurality of different ones of said lens elements are associated with the LEDs at opposite ends of each of the rows in order to provide more refractive power than other ones of said lens elements associated with said LEDs there between along the row, and said LEDs at said opposite ends of each of said rows being different ones of said LEDs of said second of said different colors provide a higher power output of said warning signals when said LEDs of said second of said different colors are actuated than when said LEDs of any other of said different colors are actuated by said controller.

27. A method for providing visual warning signals from a vehicle LED lamp comprising steps of:
  disposing a circuit board in a housing facing a front lens having lens elements with refractive structures;
  providing along said circuit board a plurality of LEDs each providing light of one of different colors, in which each of said LEDs is positioned with respect to a different one of said lens elements;
  controlling said LEDs of at least one of said different colors to provide one or more vehicle event signals, and said LEDs of another of said different colors to provide warning signals of one of solid on or flashing patterns; and
  positioning said LEDs of each of said different colors along said circuit board to enable with aid of the refractive structures of said lens elements to substantially provide from an entirety of said front lens illumination from the lamp in each of said different colors by those ones of said LEDs of each of said different colors.

28. A vehicle LED lamp comprising:
  a front lens;
  a plurality of LEDs presented to said front lens each providing light of one of different colors, and said LEDs being disposed in an array extending along two orthogonal dimensions;
  a controller for operating said LEDs of at least a first of said different colors to indicate one or more vehicle events, and a second of said different colors to provide a selected one of a plurality of different outputs of warning signals via said front lens, wherein said LEDs along said two orthogonal dimensions extend in rows and columns; and
  said front lens comprises at least refractive structures each disposed to principally receive light from a different one of said LEDs, said refractive structures of said lens elements associated with the LEDs at opposite ends of each of the rows provide more refractive power than other ones of said refractive structures associated with said LEDs there between along the row, and said LEDs at said opposite ends of each of said rows are different ones of said LEDs of said second of said different colors to provide a higher power output of said warning signals when said LEDs of said second of said different colors are actuated than when said LEDs of any other of said different colors are actuated by said controller.

29. The vehicle LED lamp of claim 28 wherein each of said two orthogonal dimensions substantially extends along a different one of a length and width of said front lens.

30. The vehicle LED lamp of claim 28 wherein in each of said rows every two adjacent ones of said LEDs along the row are of different ones of said different colors, and said LEDs of different ones of said columns are of a same one of said different colors.

* * * * *